United States Patent [19]

Papalos et al.

[11] Patent Number: 4,457,874

[45] Date of Patent: Jul. 3, 1984

[54] CONDENSATION PRODUCTS OF SUBSTITUTED PHENOL SULFONIC ACID AND FORMALDEHYDE

[75] Inventors: John G. Papalos, Ledgewood; Arpad Savoly, Martinsville, both of N.J.

[73] Assignee: Diamond Shamrock Chemicals Company, Dallas, Tex.

[21] Appl. No.: 396,698

[22] Filed: Jul. 9, 1982

Related U.S. Application Data

[63] Continuation-in-part of Ser. No. 294,337, Aug. 19, 1981, abandoned.

[51] Int. Cl.$^3$ ............................................ C07C 143/42
[52] U.S. Cl. ............................. 260/512 C; 260/429.9; 260/448 R; 260/501.19; 260/501.21; 106/100
[58] Field of Search .......... 260/512 C, 501.19, 501.21, 260/429.9, 448 R

[56] References Cited

U.S. PATENT DOCUMENTS

| | | | |
|---|---|---|---|
| 2,141,569 | 12/1938 | Tucker et al. | 106/27 |
| 2,905,565 | 9/1959 | Dietz et al. | 106/100 |
| 3,277,162 | 10/1966 | Johnson | 260/505 C |
| 3,333,983 | 8/1967 | Sellet | 568/780 |
| 4,322,372 | 3/1982 | Wurmli et al. | 260/512 C |
| 4,325,890 | 4/1982 | Reitz et al. | 260/512 C |

FOREIGN PATENT DOCUMENTS 1209286 10/1970 United Kingdom ............ 260/512 C

*Primary Examiner*—Nicky Chan
*Attorney, Agent, or Firm*—Leslie G. Nunn, Jr.

[57] ABSTRACT

A dispersing agent which is
(a) a condensation product of a substituted phenol sulfonic acid which is an arylphenol sulfonic acid or an aralkylphenol sulfonic acid with from about 0.5 to about 4 moles of formaldehyde per mole of substituted phenol sulfonic acid, or
(b) a condensation product of (i) a substituted phenol sulfonic acid which is an arylphenol sulfonic acid or an aralkylphenol sulfonic acid and (ii) an aryl sulfonic acid with from about 0.5 to about 4 moles of formaldehyde per mole of substituted phenol sulfonic acid and aryl sulfonic acid wherein the weight ratio of substituted phenol sulfonic acid to aryl sulfonic acid is from about 0.95:0.05 to about 0.05:0.95.

The dispersing agent may be used directly or reacted with a salt forming cation to obtain a salt. The condensation product is useful as a dispersing agent in hydraulic cement, mortar, concrete or the like.

14 Claims, No Drawings

CONDENSATION PRODUCTS OF SUBSTITUTED PHENOL SULFONIC ACID AND FORMALDEHYDE

CROSS REFERENCE TO RELATED APPLICATION

This application is a continuation-in-part of copending application U.S. Ser. No. 294,337—Papalos and Savoly, filed Aug. 19, 1981 now abandoned.

BACKGROUND OF THE INVENTION

1. Field of the Invention

This invention relates to condensation products of substituted phenol sulfonic acid and formaldehyde.

2. Description of the Prior Art

Condensation products of aromatic sulfonic acids and formaldehyde have found widespread use as dispersing agents in numerous applications such as in cement, concrete and the like.

U.S. Pat. No. 2,141,569—Tucker et al.—describes use of condensation products of certain aromatic sulfonic acids and formaldehyde as dispersing agents in cement and concrete.

U.S. Pat. No. 2,905,565—Dietz et al.—describes use of naphthol sulfonic acids and their condensates with cresol—formaldehyde resins to reduce water content in raw mix slurries in portland cement manufacture by the wet process.

U.S. Pat. No. 3,277,162—Johnson—describes preparation of condensation products of naphthalene-sulfonic acid and formaldehyde for use in oilwell cement.

U.S. Pat. No. 3,333,983—Sellet—describes preparation of aralkylphenols such as styrenated phenols by the alkylation of phenol with styrene.

SUMMARY OF THE INVENTION

A condensation product which is
(a) a condensation product of a substituted phenol sulfonic acid which is an arylphenol sulfonic acid or an aralkylphenol sulfonic acid with from about 0.5 to about 4 moles of formaldehyde per mole of substituted phenol sulfonic acid, and
(b) a condensation product of (i) a substituted phenol sulfonic acid which is an arylphenol sulfonic acid or an aralkylphenol sulfonic acid and (ii) an aryl sulfonic acid with from about 0.5 to about 4 moles of formaldehyde per mole of substituted phenol sulfonic acid and aryl sulfonic acid wherein the weight ratio of substituted phenol sulfonic acid to aryl sulfonic acid is from about 0.95:0.05 to about 0.05:0.95.

If desired, the condensation product may be used directly or reacted with a salt forming cation to obtain a salt. The condensation product is useful as a dispersing agent in numerous applications such as in hydraulic cement, concrete or the like.

DETAILED DESCRIPTION

A useful condensation product may be prepared by sulfonating one mole of one or more arylphenol or aralkylphenols with from about 1.0 to about 8.0 moles of sulfuric acid at about 20° to about 100° C. to obtain a substituted phenol sulfonic acid and then condensing one mole of substituted phenol sulfonic acid with from about 0.5 to about 4 moles of formaldehyde at about 60° to about 120° C. to obtain the free acid of the condensation product. Likewise, an arylphenol sulfonic acid or an aralkylphenol sulfonic acid and an aryl sulfonic acid may be condensed with from about 0.5 to about 4 moles of formaldehyde per mole of arylphenol sulfonic acid, aralkylphenol sulfonic acid and aryl sulfonic acid wherein the weight ratio of arylphenol sulfonic acid and aralkylphenol sulfonic acid to aryl sulfonic acid is from about 0.95:0.05 to about 0.05:0.95.

Substituted phenols include arylphenols and aralkylphenols having the formula

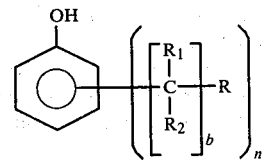

wherein R is an aryl radical such as phenyl, diphenyl, naphthyl, hydroxymethylphenol or the like; $R_1$ is hydrogen or an alkyl radical having from about 1 to about 5 carbon atoms such as methyl, ethyl, propyl, butyl, amyl or the like; $R_2$ is hydrogen or an alkyl radical having from about 1 to about 5 carbon atoms such as methyl, ethyl, propyl, butyl, amyl or the like, n is from about 1 to about 3 and b is 0 or 1 are useful.

Useful arylphenols include 4-phenylphenol, 2-phenolphenol, 2,4-diphenylphenol, 2,6-diphenylphenol, 4-naphthylphenol, 2-naphthylphenol, 4-biphenylphenol, 2-biphenylphenol and the like.

Useful aralkylphenols include alpha-methyl benzyl paraphenol, a benzylphenol prepared by alkylation of phenol with styrene. Dibenzylated and tribenzylated phenols prepared by alkylation of phenol with styrene may also be used. Isopropylidenediphenol and like aralkylphenols may be used.

Sulfonation of arylphenols and aralkylphenols may also be accomplished with other sulfonating agents such as sulfuric acid, sulfur trioxide and the like to obtain the desired substituted phenol sulfonic acid.

Useful arylsulfonic acids include sulfonic acid of the following aryl hydrocarbons: benzene, methylbenzene, propylbenzene, isopropylbenzene, butylbenzene, dimethylbenzene, diethylbenzene, diisopropylbenzene, dibutylbenzene, naphthalene, methylnaphthalene, ethylnaphthalene, proylnaphthalene, butylnaphthalene, dimethylnaphthalene, diethylnaphthalene, dibutylnaphthalene, biphenyl, methylbiphenyl, ethyldiphenyl diisobutyldiphenyl, diphenylmethane, diphenylethane, diphenylpropane, diphenylbutene, and the like.

Formaldehyde used in the arylphenol sulfonic, aralkylphenol sulfonic and aryl sulfonic condensations may be in the form of 10 to 40% aqueous solutions, 30 to 55% alcoholic solutions with alcohols such as methanol, ethanol, i-propanol, n-butanol or the like. Formaldehyde liberating compositions such as paraformaldehyde, trioxane or the like may be used. Compositions such as acetals which are capable of producing formaldehyde may also be used.

Salts of the condensation product may be prepared by neutralizing the free acid of the condensation product with a salt forming base such as an alkali metal hydroxide, an alkaline earth hydroxide, or an organic amine base. Useful bases include sodium hydroxide, potassium hydroxide, lithium hydroxide, ammonium hydroxide, zinc hydroxide, aluminum hydroxide, barium hydroxide, calcium hydroxide, magnesium hydroxide and the like. Useful organic amine bases include methylamine, diethylamine, triethanolamine, isopropanolamine and the like. Condensation products of arylphenol sulfonic acids and aralkylphenol sulfonic acids may be prepared by (a) sulfonating one mole of a substituted phenol such as an arylphenol or aralkylphenol with from about 1 to about 8 moles of a sulfonating agent at about 20° to about 120 C. to obtain a substituted phenol sulfonic acid, then (b) condensing the substituted sulfonic acid with from about 0.5 to about 4 moles of formaldehyde at about 60° to about 120° C. to obtain the free acid of the condensation product, and then optionally (c) neutralizing the free acid of the condensation product with a base to obtain a salt of the condensation product.

Condensation products of arylphenol sulfonic acids, aralkylphenol sulfonic acids and aryl sulfonic acids may be prepared by (a) sulfonating one mole of a substituted phenol with about 1 to about 8 moles of a sulfonating agent at about 20° to about 120° C. to obtain a substituted phenol sulfonic acid, then (b) adding aryl sulfonic acid to the substituted phenol sulfonic acid to obtain a mixture of substituted phenol sulfonic acid and aryl sulfonic acid wherein the weight ratio of substituted phenol sulfonic acid to aryl sulfonic acid is from about 0.95:0.05 to about 0.05:0.95, then (c) condensing the mixture of substituted phenol sulfonic acid and aryl sulfonic acid with from about 0.5 to about 4 moles of formaldehyde per mole of mixture at about 60° to about 120° C. to obtain the free acid of the condensation product, and then optionally (d) neutralizing the free acid of the condensation product with a base to obtain a salt of the condensation product.

Free acids and salts of condensation products of substituted phenol sulfonic acid and aryl sulfonic acid with formaldehyde are useful as dispersants in cement and concrete when used at concentrations of from about 0.10 to about 10% based on weight of cement. They are particularly useful in reducing viscosity of high brine cement slurries when used at concentrations of from about 0.10% to about 10% based on weight of cement. These condensation products also act as friction reducers in cement slurries and as superplasticizers in concrete mixes. They are particularly useful as viscosity reductants in cement slurries made in brine solutions. When these condensation products are added to concrete, they enhance the compressive strength of hardened concrete. Concrete is a hard, strong building material made by mixing cement, sand, gravel and water. Water in the mixture causes the cement to set and bind the entire mixture in a hard mass. It is well known in concrete technology that the strength—usually the compressive strength as measured by the ASTM test C39-72 is a reliable criterion of general quality. For this reason, the whole technology of concrete is developed around obtaining a significant and practical strength with a minimum of cost, and a maximum of convenience in use. Despite extensive research, most of the concrete presently being used are simple mixtures of sand and coarse stone containing a minor proportion of portland cement with sufficient water being added to produce a mixture fluid enough to place in forms.

It is well known in the art that, the less water used in concrete, the higher the strength; considerable research has been directed to discovering mixtures of different particle sizes of sand and stone which will give fluid concrete having minimum water content. When these condensation products are added to concrete mixes, they permit reduction in water content.

For a fuller understanding of the nature and advantages of this invention, reference may be made to the following examples. These examples are given merely to illustrate the invention and are not to be construed in a limiting sense. All quantities, proportions and percentages are by weight and all reference to temperature are °C. unless otherwise indicated.

EXAMPLE 1

This example describes preparation of a condensation product of benzylphenol sulfonic acid and formaldehyde.

I. Preparation of Benzylphenol Sulfonic Acid

| A. Composition of Reaction Mixture | Molecular Weight | Moles | Molar Ratio |
|---|---|---|---|
| 9.46 grams styrenated phenol* | 198 | 0.0477 | 1.0 |
| 14.30 grams sulfuric acid (20% SO$_3$)** | 100 | 0.143 | 3.0 |
| 12.71 grams water added after sulfonation | | | |
| 36.47 grams of reaction mixture | | | |

*benzylphenol prepared by alkylating phenol with styrene
**assigned molecular weight of H$_2$SO$_4$ B. Procedure Styrenated phenol was charged into a flask, equipped with stirrer, thermometer and ice bath. Sulfuric acid (20% SO$_3$) was then added dropwise while maintaining the temperature at 25°–35° C. After all of the sulfuric acid was added, the reaction mixture was stirred at 25°–35° C. for an additional two hours. At the end of the two hour period, the reaction mixture was heated at 75°–80° C. for about one hour. A total of 12.71 grams of water was then added to the reaction product at 75°–85° C. while controlling the temperature with external cooling.

II. Condensation of Benzylphenol Sulfonic Acid and Formaldehyde

A. Composition of Condensation Mixture

| | |
|---|---|
| 36.47 | grams benzylphenol sulfonic acid from Part I |
| 6.20 | grams formaldehyde (37%)* (mole 0.0765) |
| 36.52 | grams water |
| 20.81 | grams ammonium hydroxide (28% NH$_4$OH) |
| 100.00 | grams condensation product mixture |

*Molecular weight of 37% CH$_2$O = 81

B. Procedure

The flask containing benzylphenol sulfonic acid from Part I was heated to reflux conditions. Then the formaldehyde and water were added and the condensation mixture was heated at 95±2° C. for 24 hours. At the end of this period, the condensation was terminated and the acid value of the free acid condensation product of benzylphenol sulfonic acid and formaldehyde was determined. An acid value (AV) of 3.0 mgKOH/g was obtained by titrating the condensation product with 0.5N sodium hydroxide using phenolphthalein as the indicator. The free acid condensation product was then neutralized with ammonium hydroxide at 30°-40° C. until the pH of a 10% solution of the ammonium salt of condensation product was 7.0±0.5.

EXAMPLES 2 THROUGH 14

The procedures in Example 1 were followed using benzylphenol sulfonic acid obtained by sulfonation of one mole of styrenated phenol with three moles of fuming sulfuric acid (20% $SO_3$), condensing the benzylphenol sulfonic acid with from 0.6 to 2.0 moles of formaldehyde per mole of the sulfonic acid and neutralizing the free acid condensation product with ammonium hydroxide, sodium hydroxide or potassium hydroxide to prepare the desired salt. In Examples 6, 9, 10 and 11, calcium hydroxide was used to precipitate unreacted sulfuric acid as calcium sulfate; the precipitate was filtered off and the free acid condensation product in the filtrate neutralized with ammonium hydroxide, sodium hydroxide or potassium hydroxide. Additional data for Examples 1 through 14 are given below.

| Example | Salt | % Solids | Molar Ratio $CH_2O/RSO_3H$ | Gm of Condensation Product | Gm of Base Used |
|---|---|---|---|---|---|
| 1 | $NH_4$ | 30 | 0.6 | 190 | 35 $NH_4OH$ |
| 2 | $NH_4$ | 30 | 0.9 | 197 | 34 $NH_4OH$ |
| 3 | $NH_4$ | 30 | 1.2 | 200 | 32 $NH_4OH$ |
| 4 | $NH_4$ | 31 | 1.6 | 212 | 56 $NH_4OH$ |
| 5 | $NH_4$ | 31 | 1.6 | 200 | 52 $NH_4OH$ |
| 6 | *Ca/$NH_4$ | 30 | 1.6 | 100 | 3.7 $Ca(OH)_2$ 12 $NH_4OH$ |
| 7 | Na | 30 | 1.6 | 60 | 14 NaOH |
| 8 | K | 31 | 1.6 | 66 | 25 KOH |
| 9 | *Ca/Na | 35 | 2.0 | 100 | 4.4 $Ca(OH)_2$ 18.5 NaOH |
| 10 | *Ca/K | 35 | 2.0 | 100 | 4.4 $Ca(OH)_2$ 29.0 KOH |
| 11 | *Ca/$NH_4$ | 35 | 2.0 | 83 | 3.6 $Ca(OH)_2$ 11.5 $NH_4OH$ |
| 12 | Na | 34 | 2.0 | 100 | 28 NaOH |
| 13 | K | 34 | 2.0 | 73 | 73 KOH |
| 14 | Ca/Na | 32 | 1.6 | 100 | 5.5 $Ca(OH)_2$ 12.0 NaOH |

*Calcium hydroxide was used to remove unreacted sulfuric acid.

EXAMPLES 15 THROUGH 27

The procedures in Example 1 were followed using benzylphenol sulfonic acid obtained by sulfonating one mole of styrenated phenol with 2.5 moles of fuming sulfuric acid (20% $SO_3$), condensing the benzylphenol sulfonic acid with from 0.6 to 2.0 moles of formaldehyde per mole of the sulfonic acid and neutralizing the free acid condensation product with sodium hydroxide, potassium hydroxide or zinc hydroxide. Additional data on Examples 15 through 27 are given below.

| Example | Salt | % Solids | Molar Ratio $CH_2O/RSO_3H$ | Gm of Condensation Product | Gm of Base Used |
|---|---|---|---|---|---|
| 15 | Na | 34 | 1.2 | 150 | 36 NaOH |
| 16 | K | 34 | 1.2 | 150 | 58 KOH |
| 17 | Zn | 40 | 1.2 | 122 | 15 ZnO |
| 18 | Na | 34 | 1.4 | 150 | 36 NaOH |
| 19 | K | 34 | 1.4 | 150 | 58 KOH |
| 20 | Zn | 40 | 1.4 | 164 | 20 ZnO |
| 21 | Na | 34 | 1.6 | 150 | 39 NaOH |
| 22 | K | 34 | 1.6 | 150 | 60 KOH |
| 23 | Zn | 40 | 1.6 | 122 | 15 ZnO |
| 24 | $NH_4$ | 34 | 0.9 | 148 | 26 $NH_4OH$ |
| 25 | $NH_4$ | 34 | 1.4 | 148 | 26 $NH_4OH$ |
| 26 | $NH_4$ | 34 | 1.6 | 148 | 26 $NH_4OH$ |
| 27 | $NH_4$ | 34 | 1.2 | 145 | 26 $NH_4OH$ |

EXAMPLES 28 THROUGH 36

The procedures in Example 1 were followed using benzylphenol sulfonic acid obtained by sulfonating one mole of styrenated phenol with 2.25 moles of fuming sulfuric acid (20% $SO_3$), condensing the benzylphenol sulfonic acid with from 0.6 to 2.0 moles of formaldehyde per mole of the sulfonic acid and neutralizing the free acid condensation product with sodium hydroxide, potassium hydroxide or zinc hydroxide. Additional data on Examples 28 through 36 are given below.

| Example | Salt | % Solids | Molar Ratio $CH_2O/RSO_3H$ | Gm of Condensation Product | Gm of Base Used |
|---|---|---|---|---|---|
| 28 | Na | 34 | 1.6 | 150 | 36 NaOH |
| 29 | K | 34 | 1.6 | 150 | 56 KOH |
| 30 | Zn | 40 | 1.6 | 150 | 18 ZnO |
| 31 | Na | 34 | 1.4 | 150 | 36 NaOH |
| 32 | K | 34 | 1.4 | 150 | 56 KOH |
| 33 | Zn | 40 | 1.4 | 150 | 18 ZnO |

-continued

| Example | Salt | % Solids | Molar Ratio $CH_2O/RSO_3H$ | Gm of Condensation Product | Gm of Base Used |
|---|---|---|---|---|---|
| 34 | Na | 34 | 1.2 | 150 | 36 NaOH |
| 35 | K | 34 | 1.2 | 150 | 56 KOH |
| 36 | Zn | 40 | 1.2 | 150 | 18 ZnO |

EXAMPLE 37

This example demonstrates use of condensation products of benzylphenol sulfonic acid and formaldehyde as dispersants in high brine-cement slurries. The ammonium salts of condensation products described in Examples 1 through 4 were used in 18% brine—API Class A cement slurries.

Slurries were prepared using 327 grams of 18% by weight sodium chloride solution and 860 grams cement to obtain a total weight of 1,187 grams or a total volume of 600 ml of slurry. The slurries were prepared by pouring brine solution plus dispersant into the metal container of a Waring blender. While mixing at low speed, cement was added over a 15 second period. Blender container was then capped and mixed at high speed for 35 seconds.

Slurries were then poured into metal beakers and slurried for 20 minutes using a direct drive mixer. The slurries were then transferred into sample viscosity cups of Fann viscometer Model No. 35. With the viscometer running at 600 rpm, the sample cups were raised up to the proper level and the viscosity readings were taken after 60 seconds of continuous rotation.

Table I shows additional data of the condensation products, mole ratios of $CH_2O/RSO_3H$ used in preparations and viscosities of the high brine-cement slurries.

TABLE I

| Example | % Solids | Mole Ratio $CH_2O/RSO_3H$ | Slurry[1] Viscosity CP (600 RPM) |
|---|---|---|---|
| Blank | (No Dispersant) | — | 225 |
| 1 | 30 | 0.6 | 170 |
| 2 | 30 | 0.9 | 132 |
| 3 | 30 | 1.2 | 151 |
| 4 | 31 | 1.6 | 123 |

[1]Test conducted in 18% brine-cement slurry at 2% dispersant based on the weight of API Class A cement.

EXAMPLE 38

The procedure in Example 37 was repeated using API Class H cement instead of API Class A cement to obtain the results shown in Table II below.

TABLE II

| Example | Salt | % Solids | Mole Ratio $CH_2O/RSO_3H$ | Slurry Viscosity CP (600 RMP)[1] |
|---|---|---|---|---|
| 8 | K | 31 | 1.6 | 238 |
| 12 | Na | 34 | 2.0 | 236 |
| 7 | Na | 30 | 1.6 | 225 |
| 13 | K | 34 | 2.0 | 218 |
| 14 | Ca/Na | 32 | 1.6 | 207 |
| 4 | $NH_4$ | 31 | 1.6 | 203 |

[1]18% Brine-cement slurry and 2% dispersant based on weight of cement (type H).

EXAMPLE 39

The procedure in Example 37 was repeated using fresh water—API type H cement slurry instead of high brine—API type H cement slurry and 0.56 dispersant based on weight of cement to obtain the results given in Table III.

TABLE III

| Example | % Solids | Mole Ratio $CH_2O/RSO_3H$ | Slurry Viscosity CP (600 RMP) |
|---|---|---|---|
| Blank | (No dispersant) | — | 208 |
| 24 | 34 | 0.9 | 146 |
| 25 | 34 | 1.4 | 132 |
| 26 | 34 | 1.6 | 130 |
| 27 | 34 | 1.2 | 119 |

EXAMPLE 40

This Example demonstrates effectiveness of the condensation product of benzylphenol sulfonic acid and formaldehyde at various dispersant concentrations with and without HEC (hydroxyethyl cellulose). Table IV shows results obtained with the condensation product of Example 8 with and without HEC.

TABLE I

|  | 1 | 2 | 3 | 4 |
|---|---|---|---|---|
| A. Without HEC % Dispersant |  |  |  |  |
| Example No. 8 | 224 | 197 | 182 | 165 |
| B. With 0.1% by Wt. HEC |  |  |  |  |
| Example No. 8 | >300 | 224 | 108 | 110 |

EXAMPLE 41

This Example demonstrates the compression strength of an 18% brine—API type H cement slurry containing the condensation product of Example 8. Data on compressive strengths were taken at seven days following the procedure in ASTM standard C39-72. These results are shown in Table IV.

TABLE IV

Seven day compression strength of 18% brine-cement slurry.

| Example | 7 Day Compressive Strength (Average PSI) |
|---|---|
| Blank | 2,417 |
| 3 | 2,349 |
| 4 | 2,531 |

EXAMPLE 42

This Example demonstrates the compression strength of the condensation products of Examples 3 and 4 when tested as superplasticizers in concrete. Concrete specimens were prepared following the procedure in ASTM standard C192-76 and their compressive strengths were measured in ASTM standard C39-72. Results from these tests are shown in Table V.

TABLE V

| Example | % Solids | Mole Ratio $CH_2O/RSO_3H$ | 7 Day Compressive Strength (Average PSI) |
|---|---|---|---|
| Blank | — | — | 3,106 |
| 4 | 30 | 1.6 | 3,145 |
| 3 | 31 | 1.2 | 3,300 |

EXAMPLES 43 THROUGH 46

The procedures in Example 1 were followed using benzylphenol sulfonic acid obtained by sulfonation of one mole of styrenated phenol with 3 moles of fuming sulfuric acid (20% $SO_3$), condensing the benzylphenol sulfonic acid with 1.6 moles of formaldehyde per mole of sulfonic acid and neutralizing the free acid condensation product with magnesium hydroxide, calcium hydroxide, monoethanol amine and aluminum acetate tetrahydrate. The results from these tests are shown in Table VI.

TABLE VI

| Example | Salt | % Solids | Gm of Condensation Product | Gm of Base Used |
|---|---|---|---|---|
| 43 | Mg | 32 | 155.0 | 14.5 Mg(OH)$_2$ |
| 44 | Ca | 20 | 155.0 | 18.5 Ca(OH)$_2$ |
| 45 | monoethanol amine | 42 | 155.0 | 30.5 MEA |
| 46 | Al | 29 | 92.6 | 14.6 Al$_2$O—(C$_2$H$_3$O$_2$)$_4$.4H$_2$O |

EXAMPLE 47

Condensation Products of Monobenzylated Phenol Sulfonic Acid with Formaldehyde and Neutralized with Potassium Hydroxide Procedure
A. Sulfonation A one liter reaction flask, equipped with stirrer, thermometer and ice bath, was charged with 100 grams of monobenzylated phenol (mono styrenated phenol having a molecular weight of 198), then 166 grams of $H_2SO_4$ (20% $SO_3$, 3.33 moles)* was added slowly at 30°–40° C. over a period of two hours. After all acid was added, the reaction was stirred for an additional two hours. It was then heated at 75°–80° C. for one hour. Then 144.0 grams of water was added at 70°–80° C.

Note: *Assigned molecular weight of $H_2SO_4$ (20% $SO_3$)=100.

B. Polymerization and Neutralization

A similar reactor as described in Part A, was charged 200 grams (0.244 mole) of sulfonation product, 31.6 grams of 37% formaldehyde (0.390 mole) and 200 grams of water. The reaction was then heated at 95° C. for twenty-four hours. At the end of this period, the product was cooled to room temperature and an acid value of 179 was measured using phenolphthalein as the indicator. Based on this acid value, 200 grams of free acid was neutralized at 30°–40° C. with 80 grams of 45% KOH. The resulting polymer was 31% potassium salt with a pH of 7.5 (10% solution).

EXAMPLE 48

Condensation of Dibenzylated Phenol Sulfonic Acid with Formaldehyde and Neutralized with Potassium Hydroxide A. Sulfonation In a similar reactor as described in Example 47, there was charged 100 grams (0.342 mole) of dibenzylated phenol (distyrenated phenol). There was added 114.0 grams $H_2SO_4$ (20% $SO_3$, 3.33 moles) over a period of two hours at 50°–60° C. The reaction was stirred another two hours at 50°–60° C. It was then heated at 75°–80° C. for two hours. After this, 116.0 grams of water was added at 70°–80° C.

B. Polymerization and Neutralization

In an identical reactor as described in Example 47, was charged 200 grams (0.207 mole) of the sulfonation product, 27.0 grams of 37% formaldehyde (0.332 mole) and 200 grams of water. The reaction was then heated at 95° C. for twenty-four hours. At the end of this period, it was cooled to room temperature and an acid value of 140 was measured using phenolphthalein as the indicator. Based on this acid value, 200 grams of the free polymer was neutralized with 62 grams of 45% KOH at 30°–40° C. The neutralized product was 31% potassium salt with a pH of 7.5 (10% solution).

EXAMPLE 49

Condensation of Tribenzylated Phenol (64%) and Dibenzylated Phenol (34%) Sulfonic Acids with Formaldehyde and Neutralized with Potassium Hydroxide A. Sulfonation In a similar reactor as described in Example 47, there was charged 50 grams (0.124 mole; molecular weight 403, based on hydroxyl number of the blend) of tri and dibenzylated phenols prepared by alkylating phenol with styrene to the indicated degree of substitution. There was added 74.4 grams $H_2SO_4$, (20% $SO_3$, 0.744 mole) at 25°–45° C. over a period of two hours. The reaction was stirred another two hours at 45° C. It was then heated at 75°–80° C. for forty-five minutes. Then 67.0 grams of water was added at 70°–80° C.

B. Polymerization and Neutralization

In a similar reactor as described in Example 47, there was charged 177 grams (0.115 mole) of the sulfonation product; 18.6 grams of 37% formaldehyde (0.230 mole) and 177.0 grams water. The reaction was then heated at 95° C. for twenty-four hours. It was then cooled to room temperature and an acid value of 173.6 was measured using phenolphthalein as the indicator. Based on this acid value, 300 grams of the free acid was neutralized with 116 grams of 45% KOH. The finished product was 31% potassium salt with a pH of 7.0 (10% solution).

EXAMPLE 50

The procedure in Example 37 was repeated using API Class H cement instead of API Class A cement. The results of this test are shown in Table VII.

TABLE VII

| | 72% Cement (H) in 18% Brine Slurry at 1% of Dispersant Based on Cement (H) | | | |
|---|---|---|---|---|
| Example | Salt | % Solids | Mole Ratio CH$_2$O/RSO$_3$ | Slurry Viscosity CPS (600 RPM) 25° C. |
| 47 | K | 31 | 1.6 | 174 |
| 48 | K | 31 | 1.6 | 130 |
| 49 | K | 31 | 2.0 | 193 |

TABLE VII-continued

72% Cement (H) in 18% Brine Slurry at
1% of Dispersant Based on Cement (H)

| Example | Salt | % Solids | Mole Ratio $CH_2O/RSO_3$ | Slurry Viscosity CPS (600 RPM) 25° C. |
|---|---|---|---|---|
| Blank | (no dispersant) | | | off scale 300 |

EXAMPLE 51

The procedure in Example 37 was repeated using API Class H cement instead of API Class A cement in fresh water cement slurries. The result of the polymers tested are listed in Table VIII.

TABLE VIII

72% Cement H in Fresh Water at
1% of Dispersant on Weight of Cement

| Example | Salt | % Solids | Mole Ratio $CH_2O/SO_3H$ | Slurry Viscosity CPS (600 RPM) 25° C. |
|---|---|---|---|---|
| 44 | Ca | 20 | 1.6 | 97 |
| 45 | monoethanol amine | 42 | 1.6 | 130 |
| Blank | no dispersant | | | 141 |

EXAMPLE 52

Condensation Product of 4',4-Isopropylidenediphenol Sulfonic Acid with Formaldehyde and Neutralized with Potasssium Hydroxide

A. Sulfonation

In a similar reactor as described in Example 47, there was charged 73.0 grams $H_2SO_4$ (20% $SO_3$, 0.730 mole). Then 50 grams of 4',4-isopropylidenediphenol (0.219 mole) was added slowly at room temperature. The reaction's exotherm raised the temperature at 70°–80° C. where all the 4',4-isopropylidenediphenol was added. The reaction was then heated at 110° C. for 3.0 hours. Then 123.0 grams of water was added, under reflux, and the sulfonation product was cooled to room temperature.

B. Polymerization and Neutralization

In a similar reactor as described in Example 47, there was charged 100 grams (0.089 mole) of the sulfonation product (A), 7.2 grams 37% formaldehyde (0.089 mole) and 63.0 grams of water. The reaction was then heated at 95° C. for twenty-four hours. It was then cooled to room temperature and an acid value of 140 was measured using phenolphthalein as the indicator. Based on this acid value, 150 grams of the acid was neutralized with 50 grams of KOH (45%). The resulting product was 30% potassium salt with a pH of 7.6 (10% solution).

EXAMPLE 53

The procedure in Example 37 was repeated using API Class H cement instead of API Class A cement in fresh water cement slurries. The result of the products tested are listed in Table IX.

TABLE IX

72% Cement H in Fresh Water at
0.56% of Dispersant on Weight of Cement

| Example | Salt | % Solids | Mole Ratio $CH_2O/RSO_3H$ | Slurry Viscosity CPS (600 RPM) 25° C. |
|---|---|---|---|---|
| 1 | K | 30 | 4.0 | 130 |
| 52 | K | 32 | 1.0 | 129 |
| Blank | (no dispersant) | | | 141 |

EXAMPLE 54

The procedure in Example 37 was repeated except 0.86 gram (0.1% hydroxyethyl cellulose, HEC) based on weight of cement was added to the 18% brine/cement slurry. The result of the product tested is shown in Table X.

TABLE X

| | % Dispersant | |
|---|---|---|
| Example I | 3 | 4 |
| without HEC | 182 | 165 cps at 600 rpm |
| with 0.1% HEC | 108 | 100 cps at 600 rpm |
| blank (no dispersant) - off scale 300 | | |

Note:
That viscosity was much lower when HEC was present in the slurry as a fluid loss additive. Carboxymethylcellulose (CMC), polyacrylamide (PAM) or carboxymethylhydroxyethylcellulose (CMHEC) may be substituted for HEC.

EXAMPLE 55

Condensation Product of p-Phenylphenol Sulfonic Acid with Formaldehyde and Neutralized with Potassium Hydroxide

A. Sulfonation

In a similar reactor as described in Example 47, there was charged 97.9 grams $H_2SO_4$ (20% $SO_3$, 0.979 mole). Then 50 grams of p-phenylphenol (0.294 mole) was added slowly at room temperature. The exotherm from the reaction raised the temperature at 70°–80° C. where all p-phenylphenol was added. The reaction was then heated at 110° C. for 3.5 hours. Then 145.0 gram of water was added, under reflux, and the product cooled to room temperature.

B. Polymerization and Neutralization

In a similar reactor as described in Example 47, there was charged 100 grams (0.100 mole) of the sulfonation product, 8.9 grams 37% formaldehyde (0.110) mole and 51.0 grams of water. The reaction was then heated at 95° C. for twenty-four hours. It was then cooled to room temperature and an acid value of 190.4 was measured using phenolphthalein as the indicator. Based on this acid value, 140 grams of the acid was neutralized with 58 grams of 45% KOH. The final product was 31% potassium salt with a pH of 8.0 (10% solution).

EXAMPLE 56

Condensation Product of p-Phenylphenol Sulfonic Acid and Naphthalene Sulfonic Acid with Formaldehyde and Neutralized with Potassium Hydroxide Polymerization and Neutralization In a similar reactor as described in Example 47, there was charged 50 grams of sulfonation product of Example 55; (0.0645 mole), 30.7% grams naphthalene sulfonic acid (0.1290 mole) and 18.8 grams of 37% formaldehyde (0.232 mole) and 11.0 grams water at 60° C. The reaction mixture was then heated to reflux (103° C.) for twenty-four hours. It was then cooled to room temperature and an acid value of 151.2 was measured using phenolphthalein as the indicator. Based on this acid value, 189 grams of the acid was neutralized with 64 grams of 45% KOH. The final product was 33% potassium salt with a pH of 8.0 (10% solution).

EXAMPLE 57

Condensation Product of Styrenated Phenol Sulfonic Acid and Naphthalene Sulfonic Acid with Formaldehyde and Neutralized with Potassium Hydroxide Polymerization and Neutralization In an identical reactor as described in Example 47, there was charged 30 grams of sulfonation product of Example I (0.0355 mole) and 8.45 grams naphthalene sulfonic acid (0.0355 mole) 6.9 grams 37% formaldehyde and 38.0 grams water at 60° C. The sulfonation product was styrenated phenol sulfonic acid of Example I which contained 80% monostyrenated and 20% distyrenated phenols. The reaction mixture was then heated to reflux (105° C.) for twenty-four hours. It was then cooled to room temperature and an acid value of 168 was determined using phenolphthalein as the indicator. Based on this acid value, 81 grams of the acid was neutralized with 29 grams of 45% KOH. The resulting polymer was 33% potassium salt with a pH of 8.5 (10% solution).

EXAMPLE 58

Condensation Product of p-Phenylphenol Sulfonic Acid and Xylene Sulfonic Acid with Formaldehyde and Neutralized with Potassium Hydroxide A. Sulfonation and Polymerization of Xylene Sulfonic Acid In a similar reactor as described in Example 47, there was charged 106 grams of xylene (1.0 mole). There was added with fast stirring, 150 grams of fuming $H_2SO_4$ (20% $SO_3$) at 20°-40° C. over a period of two hours. Next, the reaction was heated at 90°-95° C. for 2.25 hours. It was then cooled to room temperature and 138.0 grams of water was added at 30°-40° C. Then to 200 grams of sulfonation product (0.508 mole) was added 20.5 grams of 37% formaldehyde (0.254 mole) and heated to reflux (110° C.) for eight hours. At the end of this period, all formaldehyde was reacted as determined via standard $Na_2SO_3$ titration procedure.

B. Condensation of Xylene Sulfonic Acid and p-Phenylphenol Sulfonic Acid with Formaldehyde and Neutralization with Potassium Hydroxide In a similar reactor as described in Example 47, there was charged 50 grams (0.645 mole) of sulfonation product of Example 55 (A), 56 grams (0.0645 mole) of sulfonation product of Example 58 (A), 12.5 (0.155 mole) of 37% formaldehyde and 76 grams of water. The reaction mixture was then heated to reflux (103° C.) for twenty-four hours. It was then cooled to room temperature and an acid value of 196 was measured using phenolphthalein as the indicator. Based on this acid value, 192.5 grams of the copolymer acid was neutralized with 83.8 grams of 45% potassium hydroxide. The final product was 33% potassium salt with a pH of 8.5 (10% solution).

EXAMPLE 59

Condensation of Xylene Sulfonic Acid and Distyrenated Phenol Sulfonic Acid with Formaldehyde and Neutralized with Potassium Hydroxide A. Sulfonation of Distyrenated Phenol In a similar reactor as described in Example 47, there was charged 100 grams (0.325 mole) of distyrenated phenol (mol. wt. 308, based on OH value). There was added, with fast stirring, 146 grams (1.461 mole) of fuming $H_2SO_4$ (20% $SO_3$) at 50°-60° C. over a two hour period. The reaction continued at 60° C. for an additional two hours and at 95° C. for one hour. Then 132.6 grams of water was then added at 80°-90° C. and the reaction was cooled to room temperature.

B. Polymerization and Neutralization

In a similar reactor as described in Example 47, there was charged 75 grams of the sulfonation product of Example 59 (A) (0.0644 mole) and 55.90 grams of the sulfonation product of Example 58 (A) (0.0644 mole), 12.5 grams of 37% formaldehyde (0.1547 mole) and 100 grams of water. The reactants were then heated to reflux (103° C.) for twenty-four hours. It was then cooled to room temperature and an acid value of 180 was measured using phenolphthalein as the indicator. Based on this acid value, 192.5 grams of free acid polymer was neutralized with 76.95 grams of 45% KOH. The resulting polymer was 34% potassium salt with a pH of 8.0 (10% solution).

EXAMPLE 60

The procedure in Example 37 was repeated using API Class H cement in 18% brine/cement slurry. The result of all products tested are listed in Table XI.

TABLE XI

| | 72.5% Cement (H) in 18% Brine Slurry at 1% of Dispersant Based on Cement (H) | | | |
|---|---|---|---|---|
| Example | Salt | % Solids | Mole Ratio $CH_2O/RSO_3H$* | Slurry Viscosity CPS (600 RPM) 25° C. |
| 55 | K | 31 | 1.0 | 166 |
| 56 | K | 33 | 1.2 | 184 |
| 57 | K | 33 | 1.0 | 189 |
| 58 | K | 33 | 1.2 | 178 |
| 59 | K | 34 | 1.2 | 180 |

Blank (no dispersant) off scale 300.
*Mole ratio of formaldehye is based on the sum of the sulfonated monomers.

While the invention has been described with reference to certain specific embodiments thereof, it is understood that it is not to be so limited since alterations and changes may be made therein which are within the full and intended scope of the appended claims.

What is claimed is:

1. A condensation product and salts thereof selected from the group consisting of
   (a) condensation product of a substituted phenol sulfonic acid selected from the group consisting of an arylphenol sulfonic acid and an aralkylphenol sulfonic acid with from about 0.5 to about 4 moles of formaldehyde per mole of substituted phenol sulfonic acid, and
   (b) condensation product of (i) a substituted phenol sulfonic acid selected from the group consisting of an arylphenol sulfonic acid and an aralkylphenol sulfonic acid and (ii) an aryl sulfonic acid with from about 0.5 to about 4 moles of formaldehyde per mole of substituted phenol sulfonic acid and aryl sulfonic acid wherein the weight ratio of substituted phenol sulfonic acid to aryl sulfonic acid is from about 0.95:0.05 to about 0.05:0.95.

2. The condensation product of claim 1 wherein the substituted phenol sulfonic acid has from about 1 to about 8 sulfonic acid groups.

3. The condensation product of claim 1 having a substituted phenol of formula

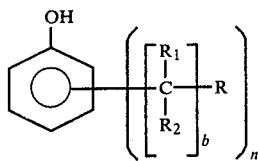

wherein
R is an aryl radical,
$R_1$ is hydrogen or an alkyl radical having from about 1 to about 5 carbon atoms,
$R_2$ is hydrogen or an alkyl radical having from about 1 to about 5 carbon atoms,
n is from 1 to 3, and
b is from 0 to 1.

4. The salt of the condensation product of claim 1 wherein a salt forming cation is selected from the group consisting of sodium, potassium, lithium, ammonium, zinc, calcium, barium, magnesium, aluminum, methylamine, monoethanolamine, diethanolamine, triethanolamine and isopropanolamine.

5. The potassium salt of the condensation product of claim 1 wherein one mole of aralkylphenol is sulfonated with 3 moles of sulfonating agent to obtain aralkylphenol sulfonic acid and one mole of the aralkylphenol sulfonic acid is then condensed with 1.8 moles of formaldehyde.

6. The sodium salt of the condensation product of claim 1 wherein one mole of aralkylphenol is sulfonated with 3 moles of sulfonating agent to obtain aralkylphenol sulfonic acid and one mole of the aralkylphenol sulfonic acid is then condensed with 1.4 moles of formaldehyde.

7. The ammonium salt of the condensation product of claim 1 wherein one mole of aralkylphenol is sulfonated with 3 moles of sulfonating agent to obtain aralkylphenol sulfonic acid and one mole of the aralkylphenol sulfonic acid is then condensed with 1.2 moles of formaldehyde.

8. The condensation product of claim 1 wherein the aralkylphenol sulfonic acid is monobenzylphenol sulfonic acid.

9. The condensation product of claim 1 wherein the aralkylphenol sulfonic acid is dibenzylphenol sulfonic acid.

10. The condensation product of claim 1 wherein the aralkylphenol sulfonic acid is tribenzylphenol sulfonic acid.

11. The condensation product of claim 1 wherein the aralkylphenol sulfonic acid is isopropylidenediphenol sulfonic acid.

12. The condensation product of claim 1 wherein the aryl phenol sulfonic acid is phenylphenol sulfonic acid.

13. The condensation product of claim 1 wherein the aryl sulfonic acid is naphthalene sulfonic acid.

14. The condensation product of claim 1 wherein the aryl sulfonic acid is xylene sulfonic acid.

* * * * *